United States Patent
Matsui

(10) Patent No.: US 8,035,694 B2
(45) Date of Patent: Oct. 11, 2011

(54) DATA PROCESSING APPARATUS, CONTROL METHOD FOR THE DATA PROCESSING APPARATUS, AND COMPUTER PROGRAM CAUSING COMPUTER TO EXECUTE THE CONTROL METHOD

(75) Inventor: Akira Matsui, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 801 days.

(21) Appl. No.: 11/938,381

(22) Filed: Nov. 12, 2007

(65) Prior Publication Data
US 2010/0020186 A1    Jan. 28, 2010

(30) Foreign Application Priority Data
Nov. 15, 2006   (JP) ................. 2006-309229

(51) Int. Cl.
*H04N 5/232*   (2006.01)
(52) U.S. Cl. .................. 348/211.3; 348/333.11
(58) Field of Classification Search ........... 348/14.01, 348/14.02, 47–48, 211.1–211.3, 211.11, 348/207.99, 207.1, 207.2, 207.11, 333.11, 348/333.12
See application file for complete search history.

(56) References Cited

U.S. PATENT DOCUMENTS

| | | | |
|---|---|---|---|
| 7,158,172 B2 * | 1/2007 | Kawaoka et al. | 348/211.1 |
| 7,511,737 B2 * | 3/2009 | Singh | 348/211.3 |
| 2003/0021591 A1 * | 1/2003 | Grosvenor et al. | 386/124 |
| 2003/0107654 A1 * | 6/2003 | Ohmura | 348/207.99 |
| 2006/0068702 A1 | 3/2006 | Miwa et al. | |

FOREIGN PATENT DOCUMENTS

| | | | |
|---|---|---|---|
| JP | 2003-143457 A | | 5/2003 |
| JP | 2004-007120 A | | 1/2004 |
| JP | 2004-086492 A | | 3/2004 |
| JP | 2004-178187 A | | 6/2004 |
| JP | 2004-187001 A | | 7/2004 |
| JP | 2005110039 A | * | 4/2005 |
| JP | 2005-319047 A | | 11/2005 |

* cited by examiner

*Primary Examiner* — Tuan Ho
(74) *Attorney, Agent, or Firm* — Canon U.S.A., Inc. IP Division

(57) ABSTRACT

A data processing apparatus detects attribute information of image data, and sets a wireless communication parameter based on the detected attribute information. The wireless communication parameter used for performing wireless communication can be easily set.

11 Claims, 6 Drawing Sheets

FIG. 1
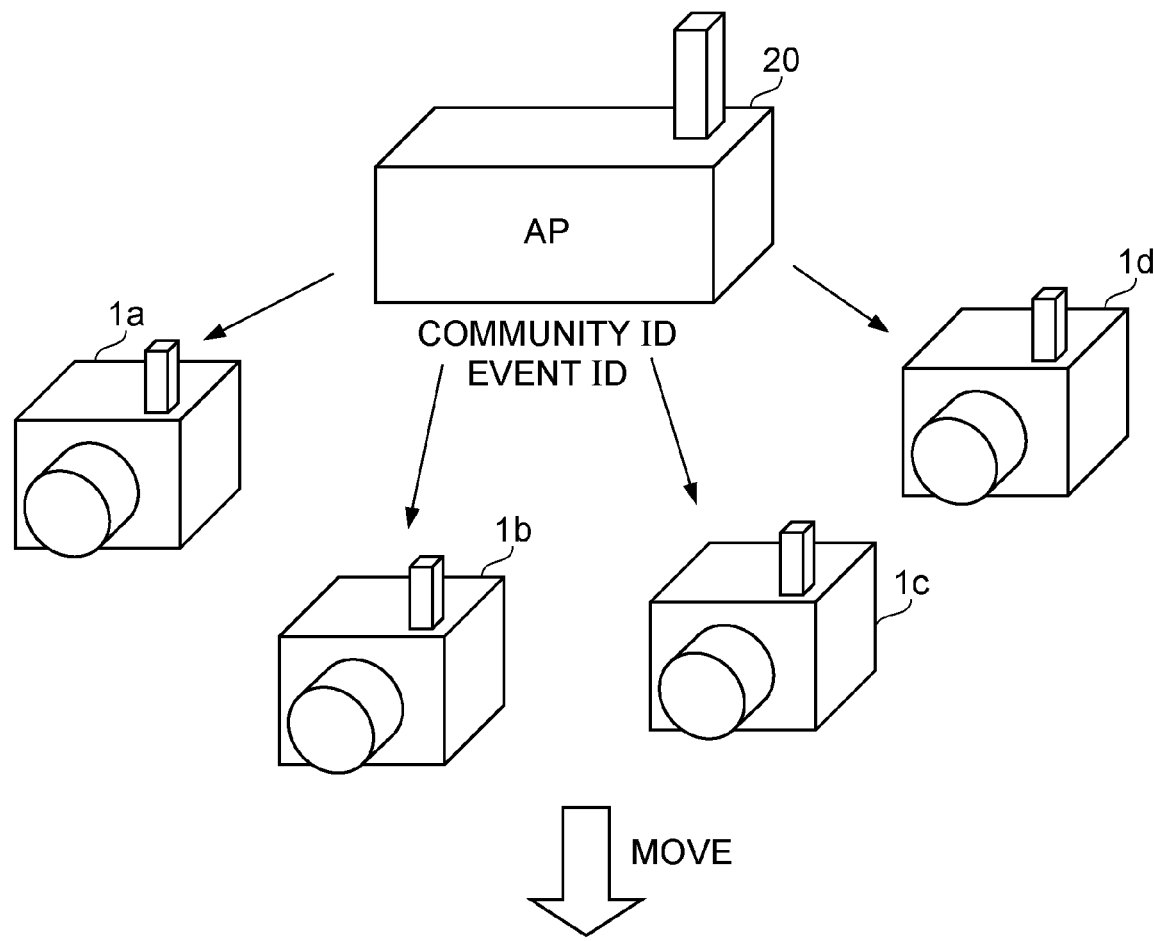
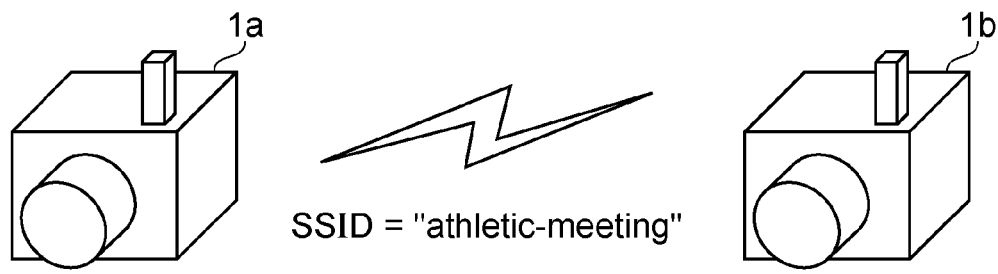

| | COMMUNITY ID | EVENT ID |
|---|---|---|
| 13:00-14:00<br>MOCK CAVALRY BATTLE | athletic-meeting | mock-cavalry-battle |
| 14:00-15:30<br>50-m RUN | athletic-meeting | 50-m-run |
| 15:00-16:00<br>BALL THROWING INTO BASKET | athletic-meeting | ball-throwing |

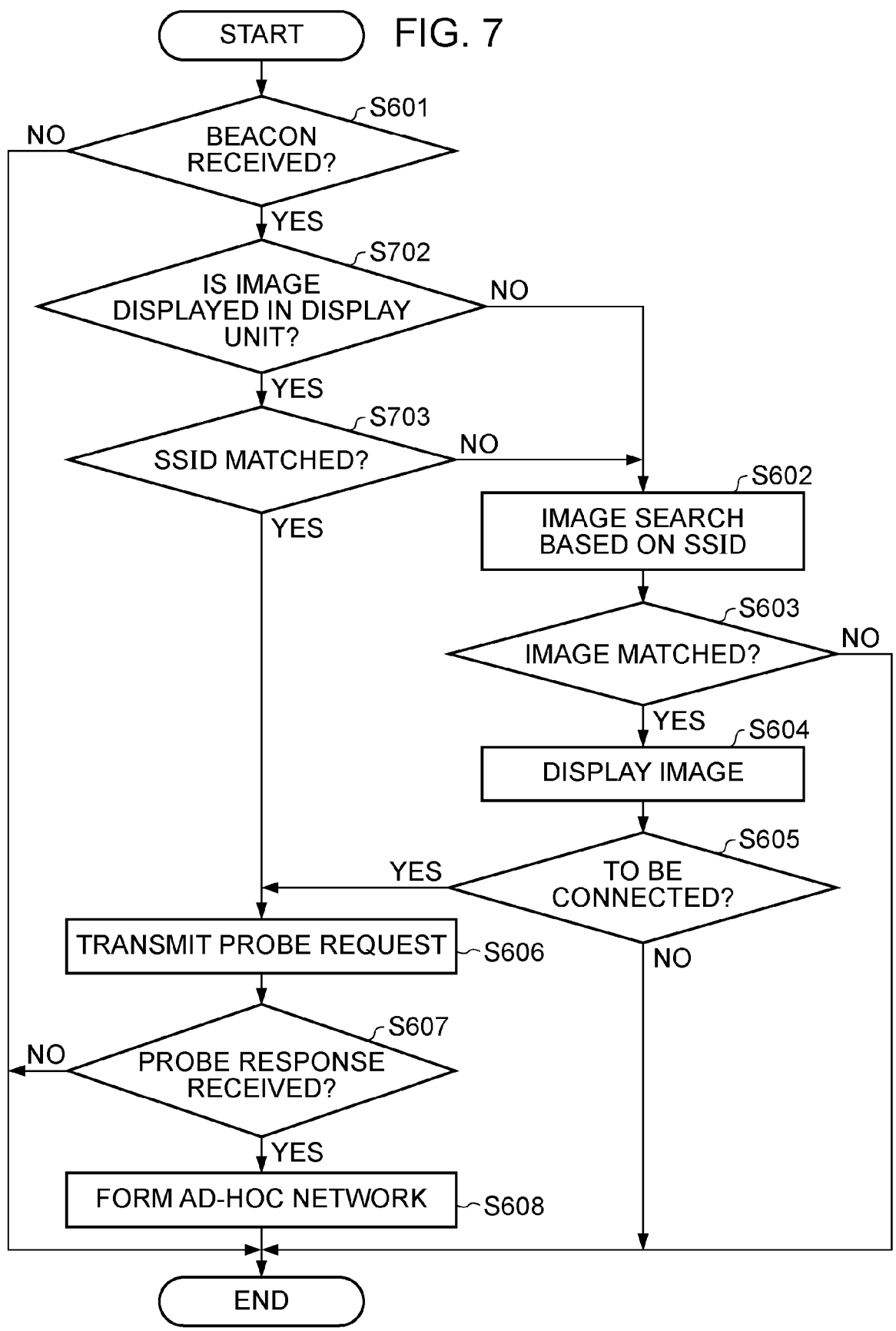

DATA PROCESSING APPARATUS, CONTROL METHOD FOR THE DATA PROCESSING APPARATUS, AND COMPUTER PROGRAM CAUSING COMPUTER TO EXECUTE THE CONTROL METHOD

BACKGROUND OF THE INVENTION

1. Field of the Invention

The present invention relates to a data processing apparatus, a control method for the data processing apparatus, and a computer program causing a computer to execute the control method.

2. Description of the Related Art

Examples of methods of exchanging images captured by digital cameras among users of those cameras include taking the captured images into a personal computer via a memory device and sending the images as an attachment to an electronic mail, and another is loading the captured images into a server on the Internet and allowing the images to be downloaded as required.

Meanwhile, digital cameras equipped with the wireless communication function using the IEEE802.11 wireless LAN, for example, have also been recently marketed. Those digital cameras can directly send and receive images via wireless communication between them.

When communication is performed by using the IEEE802.11 wireless LAN, wireless communication parameters, such as a network identifier (SSID), a communication channel, an encryption method, an encryption key, an authentication method, an authentication key, have to be set in each device (see US Patent Application No. 2006/0068702, Japanese Patent Laid-Open No. 2004-007120, and Japanese Patent Laid-Open No. 2004-187001).

Those wireless communication parameters are usually set through a user interface of the device. However, such a setting operation is troublesome. In a device not having a keyboard like a digital camera, particularly, it is not easy to input strings of characters, such as the SSID and the encryption key.

SUMMARY OF THE INVENTION

In view of the problems described above, the present invention is directed to a data processing apparatus capable of communicating with another communication apparatus, in which a wireless communication parameter can be easily set.

According to a first aspect of the present invention, a data processing apparatus includes a detecting unit configured to detect attribute information of image data, and a setting unit configured to set a wireless communication parameter, which is used for performing wireless communication, based on the attribute information detected by the detecting unit.

According to a second aspect of the present invention, a control method for a data processing apparatus includes the steps of detecting attribute information of image data, and setting a wireless communication parameter, which is used for performing wireless communication, based on the attribute information detected by the detecting unit.

Further features of the present invention will become apparent from the following description of exemplary embodiments with reference to the attached drawings.

BRIEF DESCRIPTION OF THE DRAWINGS

FIG. 1 illustrates the configuration of a communication system according to first and second exemplary embodiments of the present invention.

FIG. 7 is a flowchart of the operation of the digital camera according to the second exemplary embodiment.

DESCRIPTION OF THE EMBODIMENTS

Figure 2:
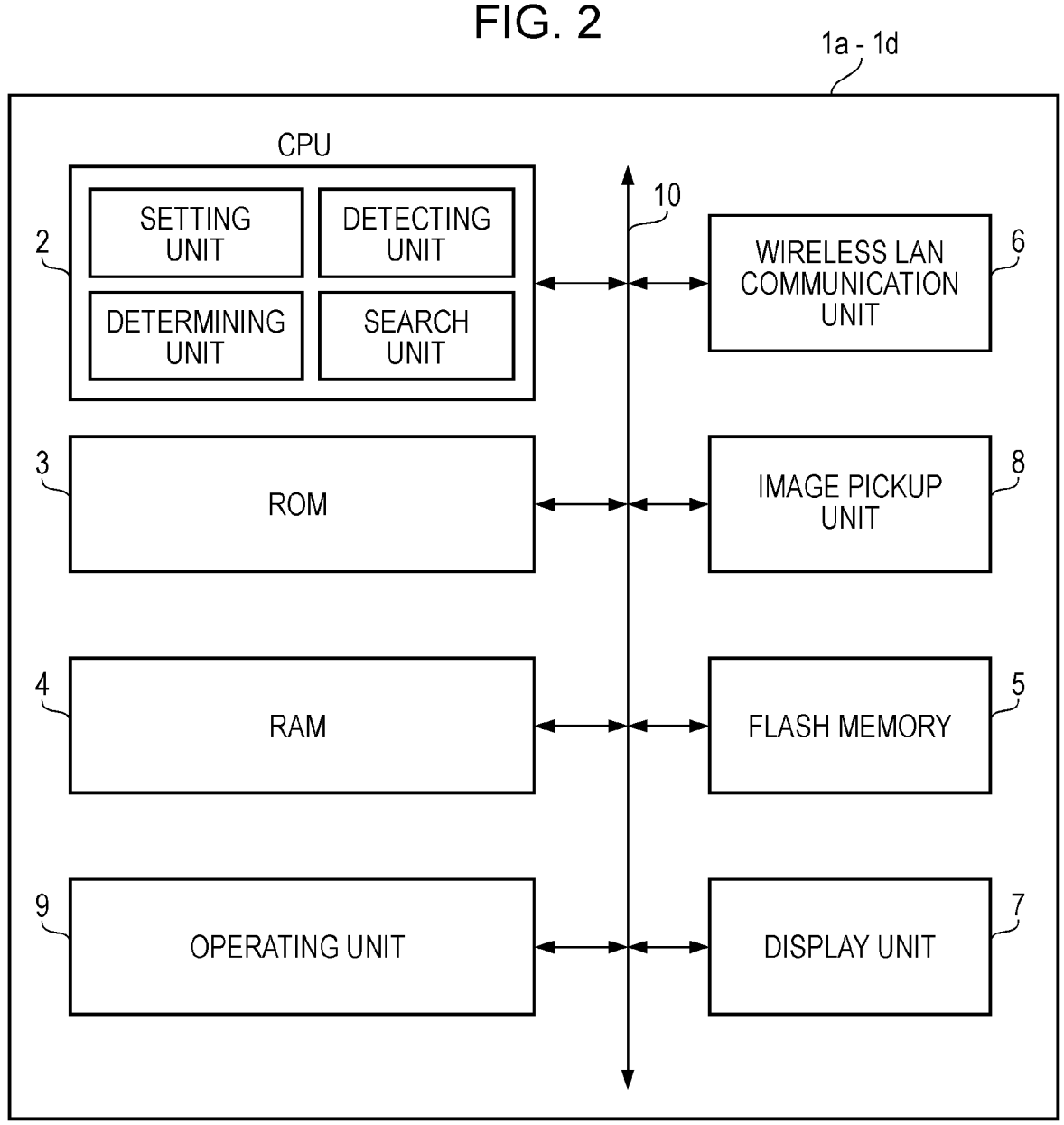
FIG. 2 is a block diagram of each of digital cameras according to the first and second exemplary embodiments.

Exemplary embodiments of the present invention will be described in detail below with reference to the drawings.

First Exemplary Embodiment

A first exemplary embodiment of the present invention is described in detail with reference to the drawings.

FIG. 1 illustrates the system configuration according to the first exemplary embodiment.

Digital cameras $1a$ to $1d$ each have the wireless communication function using the IEEE802.11 wireless LAN. Reference numeral 20 denotes an access point (base station). The access point has the function of relaying and controlling communications among wireless communication apparatuses.

It is herein supposed that persons (users) participating in an athletic meeting capture images by the digital cameras $1a$ to $1d$, and the users of the digital cameras $1a$ and $1b$ then move to a tearoom where they exchange the captured images via a wireless network.

FIG. 2 is a block diagram showing the internal configuration of each of the digital cameras $1a$ to $1d$.

Figure 5:
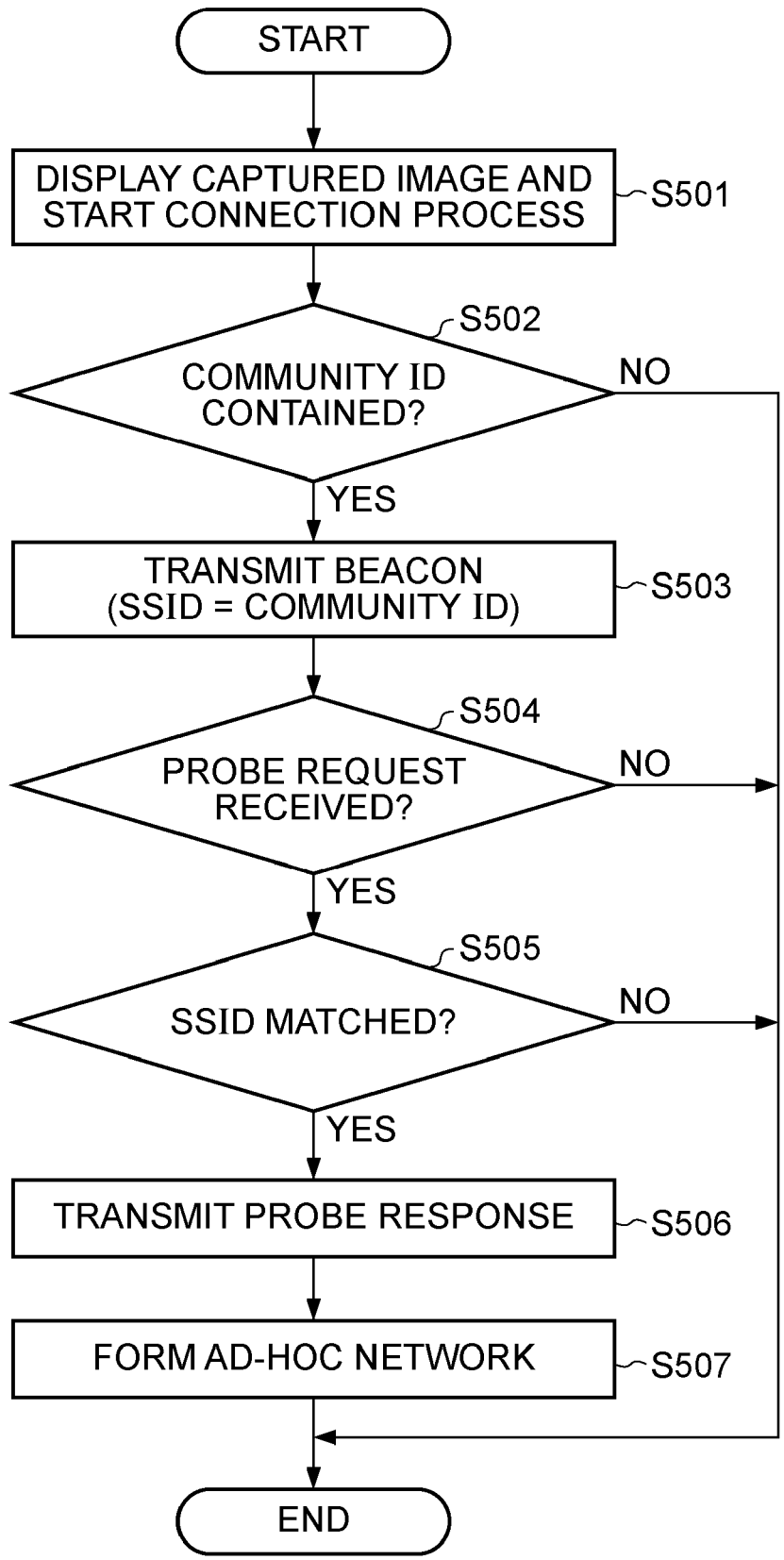
FIG. 5 is a flowchart of the operation of the digital camera according to the first and second exemplary embodiments.
Figure 6:
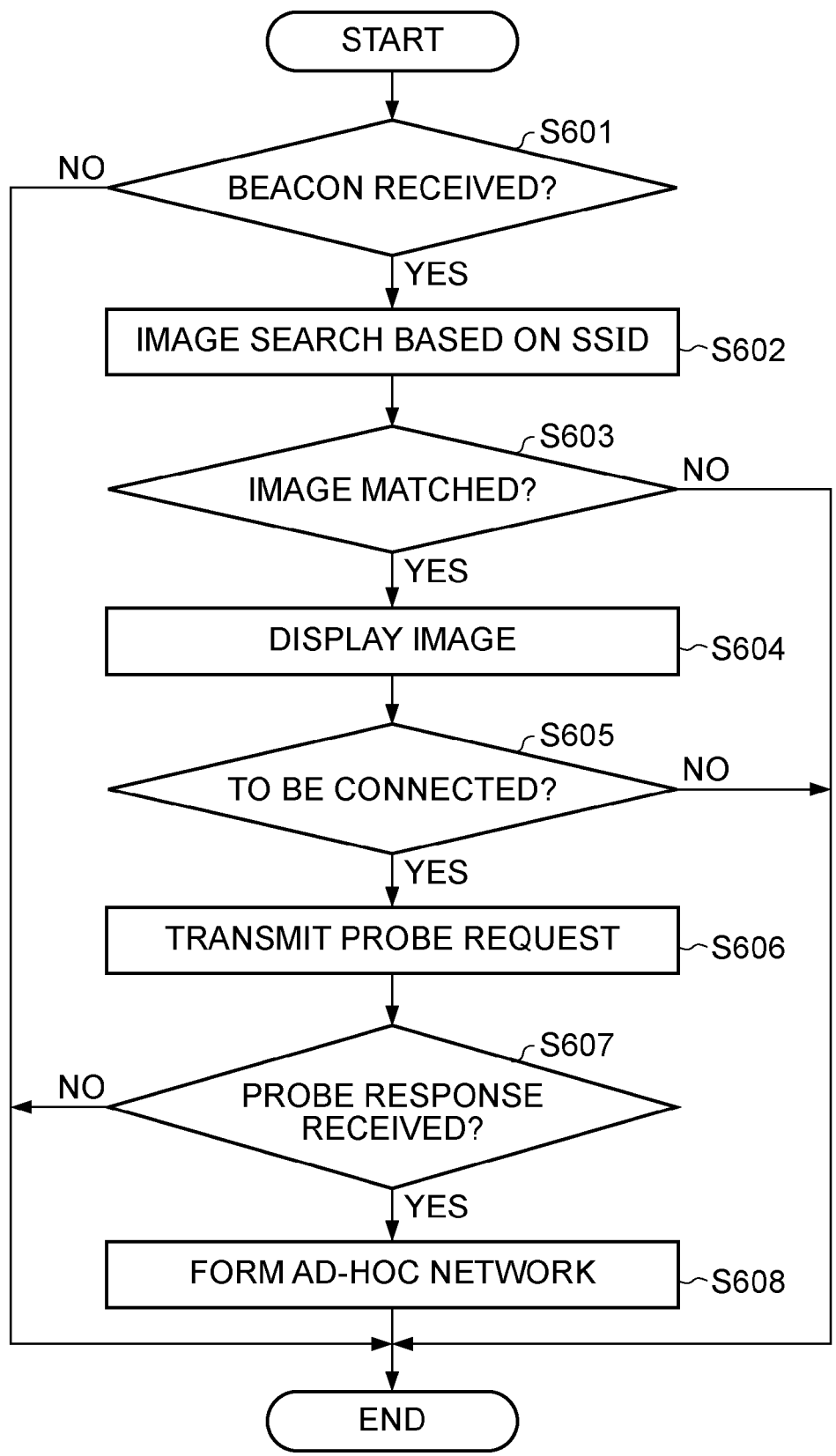
FIG. 6 is a flowchart of the operation of the digital camera according to the first exemplary embodiment.

Each digital camera includes a CPU 2 configured to control various functional units of the camera, and a ROM 3 storing operation programs shown in FIGS. 5, 6 and/or 7. The CPU 2 executes processing in accordance with the stored operation programs. The CPU 2 includes a detecting unit, a setting unit, a determining unit and a search unit, all of which execute various functions and operations described throughout this description.

The digital camera further includes a RAM 4 serving as a work area when the operation programs are operated, and a flash memory 5 storing the images captured by the digital camera. The digital camera still further includes a wireless LAN communication unit 6 configured to perform wireless communication using the IEEE802.11 wireless LAN, and a display unit 7 configured to display an object to be captured (photographed), a captured image, etc. In addition, the digital camera includes an image pickup unit 8 configured to capture the image, an operating unit 9 through which the user inputs operations, and a data and address bus 10.

The system configuration prepared in the place of the athletic meeting, shown in FIG. 1, will now be described.

Figures 3, 4:
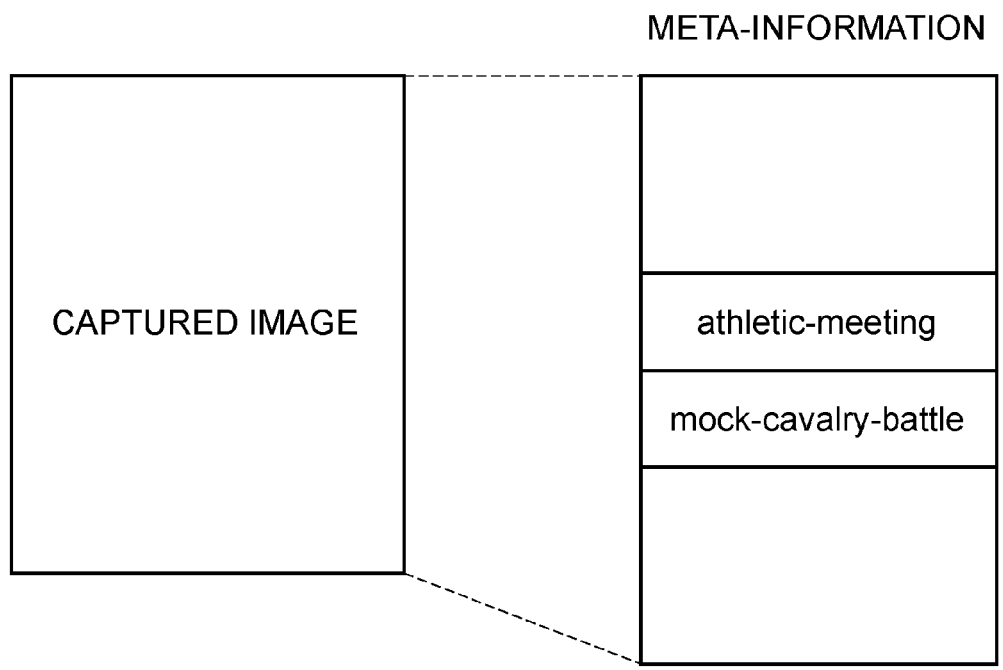
FIG. 3 illustrates an image file when a community ID and an event ID are added to meta-information.
FIG. 4 is a timetable of the community ID and the event ID.

In accordance with a timetable shown in FIG. 4, the access point 20 adds a community ID and an event ID to a beacon, i.e., a control signal for the wireless LAN, thus periodically notifying cameras $1a$ to $1d$ of those IDs. In the first exemplary embodiment, the community ID is given by "athletic-meeting" that represents information as to the place (meeting), and the event ID is given by "mock-cavalry-battle" or "ball-throwing" that represents information as to the competition performed at that time. In other words, the community ID represents information that varies depending on a location, and the event ID represents information that varies depending on time.

Instead of periodic transmission, the access point 20 can also transmit the community ID and the event ID in response to a request from each of the digital cameras 1a to 1d. Further, the periodic transmission using a beacon and the on-demand transmission in response to a request from each of the digital cameras can be used in a combined manner.

When each of the digital cameras 1a to 1d receives the community ID and the event ID transmitted from the access point 20, the received community ID and event ID are stored in the RAM 4. When those IDs are stored in the RAM 4, they can be rewritten through the steps of comparing new data with old data having been stored so far and replacing the old data with the new data only if there is a change between them. Alternatively, the IDs can be completely rewritten with new data.

When the image is captured by each of the digital cameras 1a to 1d, the community ID and the event ID stored in the RAM 4 are added as a part of meta-information of an image file and are stored in the flash memory 5. The term "meta-information" means attribute information of the image file, which is generally given by information regarding the date/time of the captured image, the photographer, etc.

Thus, the community ID representing the information as to the location where the image is captured and the event ID representing the information as to the competition performed at the time of photographing are added as a part of the meta-information of the image file. After the image file has been taken into a personal computer, management of the image file, such as rearrangement and search, can be performed based on the community ID and the event ID. FIG. 3 illustrates an example of the image file when the community ID and the event ID are added as a part of the meta-information.

The following description is made of the system configuration of the digital cameras 1a and 1b which are operated after the users of both the cameras have moved to the tearoom.

It is here assumed that the two digital cameras 1a and 1b form a wireless network based on an ad-hoc mode for wireless LAN (hereinafter referred to as an "ad-hoc network") and exchange images via the ad-hoc network. The term "ad-hoc mode" means a communication mode in which communication is performed directly between wireless communication apparatuses without using the access point.

A method of forming the ad-hoc network by the two digital cameras 1a and 1b will be described with reference to flowcharts of FIGS. 5 and 6. In the ad-hoc mode, one of the wireless communication apparatuses first transmits a beacon and the other wireless communication apparatus then receives the beacon, whereby the ad-hoc network is formed. Stated another way, the wireless communication apparatus going to start communication in the ad-hoc mode first performs Carrier Sense for a certain time. If that wireless communication apparatus does not detect the beacon in the ad-hoc mode, it starts transmission in the ad-hoc mode by itself.

The following description of the first exemplary embodiment is made on an assumption that the digital camera 1a first transmits a beacon and the digital camera 1b then receives the beacon. FIG. 5 is a flowchart of the operation of the digital camera 1a and FIG. 6 is a flowchart of the operation of the digital camera 1b. Conversely, if the digital camera 1b first transmits a beacon and the digital camera 1a then receives the beacon, the digital camera 1b performs the operation shown in FIG. 5 and the digital camera 1a performs the operation shown in FIG. 6.

The operation flow of the digital camera 1a is described with reference to FIG. 5.

First, one of the images captured in the athletic meeting is displayed in the display unit 7 of the digital camera 1a, and the start of wireless connection is instructed (S501). The start of wireless connection can be instructed by starting a wireless connection program. If the display unit 7 is constituted by a display apparatus having a touch panel, a wireless connection process can also be started by double clicking the displayed image.

Next, the digital camera 1a checks whether a community ID is contained in meta-information of an image file including the displayed image (S502). If the community ID is contained (YES in S502), the digital camera 1a sets the community ID ("athletic-meeting" in the first exemplary embodiment) as an SSID (network identifier) in a beacon and transmits the beacon (S503). By transmitting the beacon, the digital camera 1a can notify the start of formation of an ad-hoc network to other wireless communication apparatuses in the surroundings.

When another SSID is already set, that SSID can be temporarily stored in the RAM 4 and, after the completion of exchange of the image file via the ad-hoc network, the SSID stored in the RAM 4 can be set again.

After transmitting the beacon, the digital camera 1a waits for a certain time that a Probe Request is transmitted from another wireless communication apparatus (S504). The term "Probe Request" means a signal for inquiring the presence of another wireless network in the surroundings. Such a signal is used herein to request participation into the ad-hoc network.

If the Probe Request is received within the certain time (Yes in S504), the digital camera 1a confirms (S505) whether the "athletic-meeting" is set in the SSID contained in the received Probe Request, i.e., whether the SSID contained in the received Probe Request is matched with the SSID set in the beacon which has been transmitted in S503. If matched (Yes in S505), the digital camera 1a transmits a Probe Response to notify the permission of participation of the wireless communication apparatus (digital camera 1b in the first exemplary embodiment), which is a transmission source of the Probe Request, to the ad-hoc network (S506). At that time, "athletic-meeting" is set as an SSID contained in the Probe Response.

Then, the digital camera 1a sets the SSID "athletic-meeting" and forms the ad-hoc network between itself and the digital camera 1b which has received the Probe Response (S507). As a result, the digital camera 1a can transmit and receive images to and from the digital camera 1b via the ad-hoc network.

After the formation of the ad-hoc network, it is possible to allow transmission of only the image file of which meta-information includes the same community ID "athletic-meeting" as the SSID. In that case, the digital camera 1a extracts, as a transmittable (i.e., communicable) file, the image file of which meta-information includes the community ID "athletic-meeting", and temporarily stores the extracted file in the RAM 4. Thereafter, the digital camera 1a can automatically transmit all images of the extracted image file, or can successively display the images of the extracted image file in the display unit 7 and determine in response to a user's instruction whether transmission of the displayed image is started or stopped. Such a manner can reduce a risk that an image file, which is stored in the flash memory 5 of the digital camera, but which is unrelated to the athletic meeting, is transmitted to the communication partner by mistake.

After the completion of the image transmission, the setting of the SSID is canceled to bring the ad-hoc network into an end. With the above-described process, since the ad-hoc network using the community ID is temporarily formed for a time that is just required for the image exchange, security can also be maintained. Further, as described above, if another SSID is already set at the time when the community ID is set as an SSID, then another SSID can be set again later. In other words, after the completion of the image exchange, the relevant wireless communication apparatus can participate again into a wireless network to which it belonged before the formation of the ad-hoc network.

The operation flow of the digital camera 1b is described next with reference to FIG. 6.

When the start of wireless connection is instructed, the digital camera 1b waits for a certain time that it receives a beacon from another wireless communication apparatus (i.e., the digital camera 1a in the first exemplary embodiment) (S601). If the digital camera 1b receives the beacon within the certain time (Yes in S601), it searches, from among image files stored in the flash memory 5 thereof, for an image file of which meta-information has the same community ID as the SSID ("athletic-meeting" in the first exemplary embodiment) contained in the received beacon (S602).

If there is an image file having the same community ID as the SSID contained in the received beacon (Yes in S603), the digital camera 1b displays an image of that image file in the display unit 7 and also displays a user interface screen for prompting the user to instruct whether the wireless connection is started (S604).

If the wireless connection is instructed by the user (Yes in S605), the digital camera 1b transmits a Probe Request for requesting participation into an ad-hoc network to the other wireless communication apparatus which is a transmission source of the beacon (i.e., to the digital camera 1a in the first exemplary embodiment) (S606). Note that "athletic-meeting" contained in the received beacon is set as an SSID of the Probe Request. When another SSID is already set, that SSID can be temporarily stored in the RAM 4 and, after the completion of exchange of the image file via the ad-hoc network, the SSID stored in the RAM 4 can be set again.

In the case of Yes in S603, the Probe Request can also be automatically transmitted (S606) by omitting the processing of S604 and S605. With such an arrangement, a wireless network can be automatically formed without any operations made by the user.

Then, the digital camera 1b waits for a certain time that a Probe Response is received as a response to the Probe Request (S607). If the Probe Response is received within the certain time (Yes in S607), the digital camera 1b sets the SSID "athletic-meeting" and forms the ad-hoc network between itself and the wireless communication apparatus which is a transmission source of the Probe Response (i.e., the digital camera 1a in the first exemplary embodiment) (S608). As a result, the digital camera 1b can transmit and receive images to and from the digital camera 1a via the ad-hoc network.

After the formation of the ad-hoc network, it is possible to allow transmission of only the image file of which meta-information includes the same community ID "athletic-meeting" as the SSID. In that case, the digital camera 1a extracts, as a transmittable file (i.e., communicable), the image file of which meta-information includes the community ID "athletic-meeting", and temporarily stores the extracted file in the RAM 4. Thereafter, the digital camera 1a can automatically transmit all images of the extracted image file, or can successively display the images of the extracted image file in the display unit 7 and determine in response to a user's instruction whether transmission of the displayed image is started or stopped. Such a manner can reduce a risk that an image file, which is stored in the flash memory 5 of the digital camera, but which is unrelated to the athletic meeting, is transmitted to the communication partner by mistake.

After the completion of the image transmission, the setting of the SSID is canceled to bring the ad-hoc network into an end. With the above-described process, since the ad-hoc network using the community ID is temporarily formed for a time that is just required for the image exchange, security can also be maintained. Further, as described above, if another SSID is already set at the time when the community ID is set as an SSID, then another SSID can be set again later. In other words, after the completion of the image exchange, the relevant wireless communication apparatus can participate again into a wireless network to which it belonged before the formation of the ad-hoc network.

According to the first exemplary embodiment, since the community ID transmitted from the access point in the place of the athletic meeting is stored as meta-information of a captured image file and is then used an SSID, an ad-hoc network can be easily formed between digital cameras which have images captured in the same athletic meeting.

Also, after the formation of the ad-hoc network, only the image file of which meta-information includes the same community ID as the SSID is transmitted. Therefore, even when an image file unrelated to the athletic meeting is stored in the digital camera, only the images captured in the athletic meeting can be exchanged without transmitting the unrelated image file. Further, since the ad-hoc network is temporarily formed for a time that is just required for the image exchange, the images can be exchanged with satisfactory security.

While the first exemplary embodiment has been described in connection with the case of using the community ID as the SSID, the event ID can also be used instead of the community ID. By using the event ID, only images captured in the same competition can be easily exchanged between the digital cameras. Also, a modification can be made such that the user is able to select which one of the community ID and the event ID is used. In such a case, a user interface screen for the selection can be displayed in the display unit 7 when the start of wireless connection is instructed, thus prompting the user to select one of the community ID and the event ID. Further, a combination of the community ID and the event ID can be used as an SSID. In that case, the SSID is given by "athletic-meeting_mock-cavalry-battle" or "athletic-meeting_ball-throwing".

It is not always required to use, as the SSID, the community ID and/or the event ID as it is. For example, the SSID can also be set by combining the community ID and/or the event ID with arbitrary numerals (e.g., "athletic-meeting123" or "mock-cavalry-battle33". As an alternative, the SSID can be set by obtaining a character string from the community ID and/or the event ID based on a predetermined algorithm.

Second Exemplary Embodiment

Another example of processing to form an ad-hoc network in a similar system to that in the first exemplary embodiment will be described in a second exemplary embodiment. As in the first exemplary embodiment, the following description of the second exemplary embodiment is made on an assumption that the digital camera 1a first transmits a beacon and the digital camera 1b then receives the beacon, whereby the ad-hoc network is formed.

The system configuration of FIG. 1, the block diagram of FIG. 2, and the operation flow of the operation of the digital camera 1a shown in FIG. 5, which are described above in connection with the first exemplary embodiment, are similarly applied to the second exemplary embodiment and therefore a description of those drawings is not repeated here. In the second exemplary embodiment, the operation flow of the digital camera 1b partly differs from that of FIG. 6 in the first exemplary embodiment. Note that if the digital camera 1b first transmits a beacon and the digital camera 1a then receives the beacon, the digital camera 1b performs the operation shown in FIG. 5 and the digital camera 1a performs the operation shown in FIG. 7.

FIG. 7 is a flowchart of the operation flow of the digital camera 1b according to the second exemplary embodiment.

When the start of wireless connection is instructed, the digital camera 1b waits for a certain time that it receives a beacon from another wireless communication apparatus (i.e., the digital camera 1a in the second exemplary embodiment) (S601). If the digital camera 1b receives the beacon within the certain time (Yes in S601), it confirms whether an image is displayed in the display unit 7 (S702).

If the image is displayed (Yes in S702), the SSID ("athletic-meeting" in the second exemplary embodiment) contained in the received beacon is compared with the community ID added to meta-information of an image file including the displayed image (S703). If the SSID is matched with the community ID (Yes in S703), the digital camera 1b transmits a Probe Request for requesting participation into an ad-hoc network to the other wireless communication apparatus which is a transmission source of the beacon (i.e., to the digital camera 1a in the second exemplary embodiment) (S606). Note that "athletic-meeting" contained in the received beacon is set as an SSID of the Probe Request. When another SSID is already set, that SSID can be temporarily stored in the RAM 4 and, after the completion of exchange of the image file via the ad-hoc network, the SSID stored in the RAM 4 can be set again.

Then, the digital camera 1b waits for a certain time that a Probe Response is received as a response to the Probe Request (S607). If the Probe Response is received within the certain time (Yes in S607), the digital camera 1b sets the SSID "athletic-meeting" and forms the ad-hoc network between itself and the wireless communication apparatus which is a transmission source of the Probe Response (i.e., the digital camera 1a in the second exemplary embodiment) (S608). As a result, the digital camera 1b can transmit and receive images to and from the digital camera 1a via the ad-hoc network.

After the formation of the ad-hoc network, it is possible to allow transmission of only the image file of which meta-information includes the same community ID "athletic-meeting" as the SSID. In that case, the digital camera 1a extracts, as a transmittable file (i.e., communicable), the image file of which meta-information includes the community ID "athletic-meeting", and temporarily stores the extracted file in the RAM 4. Thereafter, the digital camera 1a can automatically transmit all images of the extracted image file, or can successively display the images of the extracted image file in the display unit 7 and determine in response to a user's instruction whether transmission of the displayed image is started or stopped. Such a manner can reduce a risk that an image file, which is stored in the flash memory 5 of the digital camera, but which is unrelated to the athletic meeting, is transmitted to the communication partner by mistake.

After the completion of the image transmission, the setting of the SSID is canceled to bring the ad-hoc network into an end. With the above-described process, since the ad-hoc network using the community ID is temporarily formed for a time that is just required for the image exchange, security can also be maintained. Further, as described above, if another SSID is already set at the time when the community ID is set as an SSID, then another SSID can be set again later. In other words, after the completion of the image exchange, the relevant wireless communication apparatus can participate again into a wireless network to which it belonged before the formation of the ad-hoc network.

If it is confirmed in S702 that the image is not displayed in the display unit 7 (No in S702), or if it is determined in S703 that the SSID of the received beacon is not matched with the community ID of the displayed image (No in S703), the digital camera 1b advances to a process of S602. In S602, the digital camera 1b searches, from among image files stored in the flash memory 5 thereof, for an image file of which meta-information has the same community ID as the SSID ("athletic-meeting" in the second exemplary embodiment) contained in the received beacon.

If there is an image file having the same community ID as the SSID contained in the received beacon (Yes in S603), the digital camera 1b displays an image of that image file in the display unit 7 and also displays a user interface screen for prompting the user to instruct whether the wireless connection is started (S604). If the wireless connection is instructed by the user (Yes in S605), the processing advances to S606. The subsequent processing is executed in the same manner as that described above.

Thus, according to the second exemplary embodiment, an ad-hoc network can be automatically formed just by displaying the image file, which is to be exchanged, when the user of the digital camera 1b starts the wireless connection process. Stated another way, the users of the digital camera 1a and the digital camera 1b can perform the image exchange via the ad-hoc network just by displaying images captured in the same athletic meeting and instructing the start of the wireless connection.

While the second exemplary embodiment has been described in connection with the case of using the community ID as the SSID, the event ID can also be used instead of the community ID. By using the event ID, only images captured in the same competition can be easily exchanged between the digital cameras. Also, a modification can be made such that the user is able to select which one of the community ID and the event ID is used. In such a case, a user interface screen for the selection can be displayed in the display unit 7 when the start of wireless connection is instructed, thus prompting the user to select one of the community ID and the event ID. Further, a combination of the community ID and the event ID can be used as an SSID. In that case, the SSID is given by "athletic-meeting_mock-cavalry-battle" or "athletic-meeting_ball-throwing".

It is not always required to use, as the SSID, the community ID and/or the event ID as it is. For example, the SSID can also be set by combining the community ID and/or the event ID with arbitrary numerals (e.g., "athletic-meeting123" or "mock-cavalry-battle33". As an alternative, the SSID can be set by obtaining a character string from the community ID and/or the event ID based on a predetermined algorithm.

While each of the first and second exemplary embodiments has been described above in connection with the case of using "athletic-meeting", i.e., information of the place (meeting), as the community ID and "mock-cavalry-battle" or "ball-throwing", i.e., information of the competition performed at that time, as the event ID, other kinds of information can also be used. Further, while each exemplary embodiment has been described above as installing one access point in the place of the athletic meeting, the present invention can also be applied to the case of installing a plurality of access points. In such a case, the plurality of access points installed in the place of the athletic meeting are set so as to transmit the community ID and the event ID which are common to all the access points.

While each exemplary embodiment has been described above as using the community ID and/or the event ID as the SSID, another kind of wireless communication parameter, e.g., an encryption key, can also be used.

While the digital camera incorporates the wireless communication function in each exemplary embodiment, the wireless communication function can be externally provided.

The image file handled by the digital camera can be either a still image or a moving image.

While each exemplary embodiment has been described in connection with the case of the digital camera, the present invention can be applied to any type of device, e.g., a digital video camera, a cellular phone, a PDA, and a portable game machine, so long as it has the wireless communication function and the image pickup function.

While each exemplary embodiment has been described above as using the IEEE802.11 wireless LAN, the present invention can also be applied to another type of wireless communication using, e.g., Bluetooth®, UWB, and a wireless USB. In the case of Bluetooth®, for example, the community ID and the event ID can be set as PIN codes.

While each exemplary embodiment has been described above as setting a wireless communication parameter, a parameter (such as an IP address) for use in wired communication can also be set. In such a case, a wired network can be easily and quickly formed based on information that is contained as attribute information of an image file.

According to the exemplary embodiments, a communication parameter used for performing communication can be easily set based on information that is stored as attribute information of an image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-309229 filed Nov. 15, 2006, which is hereby incorporated by reference herein in its entirety.

What is claimed is:

1. A data processing apparatus comprising:
 a selection unit configured to select image data;
 a detecting unit configured to detect meta-information of the image data selected by the selection unit; and
 a setting unit configured to set a wireless communication parameter for wireless communication, based on the meta-information detected by the detecting unit.

2. The data processing apparatus according to claim 1, further comprising:
 a determining unit configured to determine, as communicable image data, image data having the meta-information corresponding to the wireless communication parameter.

3. The data processing apparatus according to claim 2, further comprising:
 a communicating unit configured to communicate the image data, which has been determined to be communicable, via a network formed based on the wireless communication parameter.

4. The data processing apparatus according to claim 1, further comprising:
 a notifying unit configured to notify one or more communication apparatuses surrounding the data processing apparatus of information of a network based on the wireless communication parameter
 wherein the data processing apparatus forms the network in cooperation with at least one of the one or more communication apparatus which transmits a request for participation into the network.

5. The data processing apparatus according to claim 1, further comprising:
 a receiving unit configured to receive information of a network formed by a communication apparatus; and
 a searching unit configured to search for image data which includes, as meta-information, a first kind of information corresponding to a wireless communication parameter included in the network information,
 wherein the data processing apparatus participates into the network formed by the communication apparatus based on a search result by the searching unit.

6. The data processing apparatus according to claim 5, further comprising:
 a display unit configured to display an image;
 wherein the searching unit checks whether the first kind of information is contained in meta-information of image data displayed in the display unit.

7. The data processing apparatus according to claim 1, further comprising:
 an image capture unit configured to capture image data; and
 a storage unit configured to store, as meta-information of captured image data, information received from a base station when the capture unit captures the image data.

8. The data processing apparatus according to claim 1, wherein the selection unit selects the image data by displaying the image data on a display, and
 wherein the detecting unit detects meta-information of the displayed image data.

9. The data processing apparatus according to claim 1, wherein the meta-information of the image data is information based on a place or a time at which the image data is captured.

10. A control method for a data processing apparatus, the control method comprising the steps of:
 selecting image data;
 detecting meta-information of the image data selected in the selecting step; and
 setting a wireless communication parameter for wireless communication, based on the meta-information detected in the detecting step.

11. A non-transitory computer-readable storage medium storing computer-executable process steps, the computer-executable process steps comprising:
 selecting image data;
 detecting meta-information of the image data selected in the selecting step; and
 setting a wireless communication parameter for wireless communication, based on the meta-information detected in the detecting step.

* * * * *